(12) United States Patent
Hammer et al.

(10) Patent No.: US 11,859,076 B2
(45) Date of Patent: Jan. 2, 2024

(54) BIODEGRADABLE PLAYDOUGH AND MANUFACTURING PROCESSES THEREOF

(71) Applicant: Shachar Group Ltd, Timmorim (IL)

(72) Inventors: Ifat Hammer, Rehovot (IL); Tal Liezer, Zichron Yaakov (IL); Yitzhak Shahar, Tel Aviv (IL); Ana Dotan, Ramat Gan (IL); Gali Levy, Ramat Gan (IL)

(73) Assignee: SHACHAR GROUP LTD, Timmorim (IL)

( * ) Notice: Subject to any disclaimer, the term of this patent is extended or adjusted under 35 U.S.C. 154(b) by 72 days.

(21) Appl. No.: 17/899,671

(22) Filed: Aug. 31, 2022

(65) Prior Publication Data

US 2023/0174749 A1    Jun. 8, 2023

(30) Foreign Application Priority Data

Dec. 5, 2021 (IL) .......................................... 288691

(51) Int. Cl.
    *C08L 3/02*          (2006.01)
    *C08L 3/04*          (2006.01)
    *A21D 17/00*      (2006.01)

(52) U.S. Cl.
    CPC ................ *C08L 3/02* (2013.01); *A21D 17/00* (2013.01); *C08L 3/04* (2013.01)

(58) Field of Classification Search
    CPC .............................. A21D 17/00; A21D 17/002
    See application file for complete search history.

(56) References Cited

U.S. PATENT DOCUMENTS

| | | | | |
|---|---|---|---|---|
| 4,172,054 | A | * | 10/1979 | Ogawa .................... C08L 29/04 524/53 |
| 6,713,624 | B1 | | 3/2004 | Doane et al. |
| 2006/0110514 | A1 | * | 5/2006 | Kortum .................. A21D 13/30 426/549 |
| 2020/0093143 | A1 | * | 3/2020 | Mandl .................. A21D 17/002 |
| 2022/0025184 | A1 | * | 1/2022 | Osnato ..................... C08K 3/16 |

FOREIGN PATENT DOCUMENTS

JP      2003342477 A      12/2003

OTHER PUBLICATIONS

Unal (Simply Sensational Sensory Activities for Preschool Children, Office of Child Care and Family Resources, https://occfr.wisc.edu/wp-content/uploads/2017/02/ECC_recipes_booklet_from_Cigdem.pdf, 2017) (Year: 2017).*
Fernandez-Pelaez et al. (Physical Properties of Flours Obtained fromWasted Bread Crusts and Crumbs. Foods 2021, 10, 282) (Year: 2021).*
Stampfli et al. (Food Chemistry 52, 1995, 353-360) (Year: 1995).*
Hellomaphie "Turn Bread into Clay DIY" YouTube [online] [video] Dec. 29, 2015 [retrieved on Apr. 6, 2022]. Retrieved from.

* cited by examiner

*Primary Examiner* — Liam J Heincer
(74) *Attorney, Agent, or Firm* — SOROKER AGMON NORDMAN RIBA

(57) ABSTRACT

The present disclosure provides biodegradable and compostable playdough compositions. In addition, the present disclosure also relates to playdough compositions based on recycled breads as a primary constituent. Processes of manufacturing the playdough compositions is also disclosed.

28 Claims, 14 Drawing Sheets

BIODEGRADABLE PLAYDOUGH AND MANUFACTURING PROCESSES THEREOF

CROSS-REFERENCE TO RELATED APPLICATIONS

The present application claims the benefit of Israeli Patent Application No. 288691 filed on 5 Dec. 2021, which is incorporated by reference herein in its entirety.

TECHNICAL FIELD

The present application relates to biodegradable and compostable playdough compositions, more specifically to playdough compositions based on bakery residuals as a primary constituent, and to processes for their manufacture.

BACKGROUND ART

References considered to be relevant as background to the presently disclosed subject matter are listed below:
U.S. Pat. No. 4,172,054
U.S. Pat. No. 6,713,624
Acknowledgement of the above references herein is not to be inferred as meaning that these are in any way relevant to the patentability of the presently disclosed subject matter.

BACKGROUND

For many years, most manufacturers and production facilities have operated using a linear, 'produce, use, dispose' economy. Such approach results in disposal of waste materials instead of recycling of unused raw materials and waste associated with the production and consumption. Disposal of such materials often involves various disposal methods, for example burial, burning, and landfill piling, which have negative environmental effects (such as methane and other contaminants emission, contamination of water sources, and so forth). Further, a non-recycling manufacturing approach results in over-extraction of natural resources in order to fulfill the increased need of raw materials, increase in resources invested for their extraction, as well as encouraging a culture of consumption where the value of materials at their end-of-life is insufficiently recognized.

In order to enable sustainability, other economical approaches need to be considered. Circular economy emphasizes the importance of keeping resources in use for as long as possible, and once the maximum value has been extracted, recovering and recycling these resources so they can be used again.

Food waste is considered as one of the major problems of the twenty-first century. According to Food and Agriculture Organization (FAO), around one-third of total food produced is lost or wasted every year worldwide. Food waste is a major portion of biodegradable municipal waste, most of which is disposed of in landfill sites where it is converted by natural anaerobic digestion into methane, a potent greenhouse gas.

Amongst the many forms of food waste, bread is a major contributor to the problem. The bakery industry is one of the world's major food industries and varies widely in terms of production scale and applications. Bakery wastes consist primarily of stale bread, bread rolls and cookies. The solid waste from baked bread, and at many times leftovers of unbaked dough, cannot be reprocessed for preparation of new bread, and is generally used as animal feed, disposed to landfills, anerobic digestion facilities, or compost sites. Landfilling eventually leads to production of greenhouse gases and groundwater pollution. Although utilization of waste bread as animal feed represents an environmentally friendly recycling route for this waste, economically it represents a very low added-value option.

Commercial breads vary in their formulations, which differ, for example, in the flour type, flour quality, gluten content, fiber content, baking additives, and so forth, making such variability a challenge for the development of standard industrial processes. Further, bread undergoes staling or retrogradation over time, which is caused by the migration of moisture from the starch granules into the interstitial spaces, causing de-gelatinization of starches. As a results, the starch amylose and amylopectin molecules realign and recrystallize, resulting in stale bread having leathery or hard texture. In other words, breads do not only vary in compositions, but also in the physical state of starch, depending on their composition and/or storage conditions.

Another challenge in bread recycling relates to microbial safety. Although many commercial breads contain preservatives, molds eventually develop within several days from production. Molds are also able to produce heat stable toxins which are considered carcinogenic.

Bread is staple food; however, it is also one of the most wasted food products. For example, it is estimated that 900,000 tons of bread are globally wasted annually. In the UK, for example, it is estimated that almost 44% of manufactured bread is eventually wasted, either domestically or along the supply chain. It would be beneficial to provide products and methods of utilizing bread leftovers and waste resulting in degradable and/or compostable products.

SUMMARY

In one aspect, there is provided a process of manufacturing a biodegradable playdough comprising at least 75 wt % of biodegradable components based on the total weight of the playdough. The process may comprise:

(a) particulating unsorted bakery residual to an average particle size of at most 200 μm, thereby obtaining particulated bakery residual;

(b) mixing the particulated bakery residual with at least one functional additive and water to obtain a mixture, and maintaining the mixture at a temperature of at least about 40° C. for a predefined period of time; and (c) cooling the mixture to a room temperature to obtain said biodegradable playdough.

In some embodiments, the bakery residual comprises one or more types of bread.

Optionally, the mixture comprises at least about 20 wt % bakery residual.

Optionally, the weight ratio of bakery residual to water is between about 1:1 and about 8:1.

In some embodiments, the particulated bakery residual has an average particle size of between about 1 μm and about 100 μm.

In some embodiments, the particulating is carried out by grinding, milling, crushing, shredding, or any combination thereof.

In some embodiments, the process may further comprise step (a0), prior to step (a), step (a0) comprising drying the unsorted bakery residual to a moisture quantity of less than about 10 wt % to obtain dried unsorted bakery residual.

Optionally, the particulating comprises wet-particulation of the unsorted bakery residual.

In some embodiments, the wet-particulation comprises mixing said unsorted bakery residual with an initial quantity of water, followed by grinding to obtain said particulated bakery residual in a slurry form.

Optionally, at step (b), the mixture is maintained at a temperature of between about 50° C. and about 90° C.

Optionally, at step (b), the period of time is at least about 5 minutes.

Optionally, period of time is at least about 10 minutes.

In some embodiments, the process may further comprise a step (a1), between steps (a) and (b), step (a1) comprises adding one or more enzymes to the mixture to permit at least partial enzymatic decomposition of at least starch and/or gluten present in the bread.

In some embodiments, the one or more enzymes are selected from the group consisting of amylases, proteases, and any mixture thereof.

In some embodiments, the process further comprises step (b'), between steps (b) and (c), step (b') comprises filtering said mixture to remove contaminants therefrom.

In some embodiments, step (b) comprises:
(b1) mixing said particulated bakery residual with at least one functional additive to obtain a blend; and
(b2) mixing said blend with said water to obtain said mixture.

Optionally, the water is heated to a temperature of between about 70° C. and about 100° C.

Optionally, the at least one functional additive is selected from the group consisting of rheology modifiers, mycotoxin scavengers, retrogradation preventing agents, colorants, odorants, antioxidants, odor masking agents, preservatives, and any mixture or combination thereof.

Optionally, the rheology modifiers are selected from the group consisting of gluten and gluten derivatives, starch and starch derivatives, vegetable oils, mineral oils, waxes, polysaccharides, and any mixture thereof.

In some embodiments, the starch and starch derivatives are selected from the group consisting of dextrin, acid tread starch, alkaline modified starch, bleached starch, oxidized starch, mono-starch phosphate, di-starch phosphate, phosphated di-starch phosphate, acetylated di-starch phosphate, acetylated starch, mono-starch acetate, acetylated di-starch adipate, di-starch glycerin, hydroxypropyl-starch, hydroxypropyl di-starch glycerin, hydroxypropyl di-starch phosphate, starch sodium octenyl succinate, acetylated oxidized starch, and any mixture thereof.

In some embodiments, the starch is selected from the group consisting of one or more of corn starch, potato starch, rice starch, wheat starch, cassava starch, and any mixture thereof.

In some embodiments, the vegetable oil is selected from the group consisting of soybean oil, rapeseed oil, safflower oil (canola), sunflower oil, peanut oil, cottonseed oil, coconut oil, palm oil, olive oil, rice-bran oil, grapeseed oil, avocado oil, sesame oil, hemp oil, almond oil, and any mixture thereof.

In some embodiments, the wax is selected from the group consisting of bees' wax, soy wax, carnauba wax, candelilla wax, jojoba wax, rice bran wax, and any mixture thereof.

Optionally, the rheology modifiers are added to the mixture in an amount of between about 1 and about 20 wt %.

Optionally, the mycotoxin scavengers are selected from the group consisting of active carbon, aluminosilicates, zeolites, phyllosilicates, cellulose, cellulose derivatives, and any combination thereof.

In some embodiments, the retrogradation preventing agent is selected from one or more of biodegradable emulsifiers, biodegradable polysaccharides, oils, and any combination thereof.

In some embodiments, the process further comprises a step (d), following step (c), step (d) comprises adding at least one secondary additive to the mixture.

In some embodiments, the secondary additive is different from the at least one functional additive, and selected from the group consisting of rheology modifiers, mycotoxin scavengers, retrogradation preventing agents, colorants, odorants, antioxidants, odor masking agents, preservatives, and any mixture or combination thereof.

Optionally, step (d) is carried out by extrusion.

In some embodiments, step (d) further comprises adding water to the mixture.

In some embodiments, step (b) further comprises adding into the mixture at least one salt selected from the group consisting of sodium chloride (NaCl) and calcium chloride ($CaCl_2$), optionally in an amount of between about 10 and about 25 wt %.

In some embodiments, there is provided a biodegradable playdough composition, comprising:
i) at least about 20 wt % unsorted bakery residual,
ii) at most about 50 wt % water, and
iii) at least one functional additive, the biodegradable playdough composition comprising at least about 75 wt % of biodegradable components based on the total weight of the composition, the biodegradable playdough composition having a complex viscosity of between about $1 \times 10^4$ and about $1 \times 10^6$ Pa·s (as measured by parallel plates rheometer, at 25° C., at 0.1 Hz).

In some embodiments, the at least one functional additive is selected from the group consisting of a rheology modifier, a mycotoxin scavenger, a retrogradation preventing agent, a preservative, an antioxidant, a colorant, an odorant, and an odor masking agent.

Optionally, the biodegradable playdough composition is compostable.

Optionally, the bakery residual comprises one or more types of bread.

In some embodiments, the unsorted bakery residual is in particulate form, having an average particle size of no more than about 200 μm.

In some embodiments, the weight ratio of bakery residual to water in the playdough composition is between about 1:1 and about 8:1.

In some embodiments, the rheology modifier is selected from the group consisting of gluten and gluten derivatives, starch and starch derivatives, vegetable oils, mineral oils, waxes, polysaccharides, and any mixture thereof.

In some embodiments, the starch and starch derivatives are selected from the group consisting of dextrin, acid tread starch, alkaline modified starch, bleached starch, oxidized starch, mono-starch phosphate, di-starch phosphate, phosphated di-starch phosphate, acetylated di-starch phosphate, acetylated starch, mono-starch acetate, acetylated di-starch adipate, di-starch glycerin, hydroxypropyl-starch, hydroxypropyl di-starch glycerin, hydroxypropyl di-starch phosphate, starch sodium octenyl succinate, acetylated oxidized starch, and any mixture thereof.

In some embodiments, the starch is selected from the group consisting of one or more of corn starch, potato starch, rice starch, wheat starch, cassava starch, and any mixture thereof.

In some embodiments, the vegetable oil is selected from the group consisting of soybean oil, rapeseed oil, safflower oil (canola), sunflower oil, peanut oil, cottonseed oil, coconut oil, palm oil, olive oil, rice-bran oil, grapeseed oil, avocado oil, sesame oil, hemp oil, almond oil, and any mixture thereof.

Optionally, the wax is selected from the group consisting of bees' wax, soy wax, carnauba wax, candelilla wax, jojoba wax, rice bran wax, and any mixture thereof.

In some embodiments, the rheology modifier is present in the playdough composition in an amount of between about 1 and about 20 wt %.

In some embodiments, the mycotoxin scavenger is selected from the group consisting of active carbon, aluminosilicates, zeolites, phyllosilicates, cellulose, cellulose derivatives, and any combination thereof.

In some embodiments, the retrogradation preventing agent is selected from the group consisting of one or more of biodegradable emulsifiers, biodegradable polysaccharides, oils, and any combination thereof.

In some embodiments, the biodegradable playdough composition further comprises at least one salt in an amount of between about 10 and about 25 wt %.

In some embodiments, the biodegradable playdough composition has a complex viscosity of between about $1 \times 10^4$ and about $5 \times 10^5$ Pa·s (as measured by parallel plates rheometer, at 25° C., at 0.1 Hz).

In some embodiments, the biodegradable playdough composition is obtained by a process similar to the process described hereinabove.

In some embodiments, there is provided a kit comprising one or more portioned quantities of a playdough composition as detailed above and as will be detailed hereinbelow, and at least one organoleptic additive.

In some embodiments, there is provided a kit comprising two or more portioned quantities of a playdough composition as detailed above and as will be detailed hereinbelow, the two or more portioned quantities differing from one another by at least one property.

BRIEF DESCRIPTION OF THE DRAWINGS

In order to better understand the subject matter that is disclosed herein and to exemplify how it may be carried out in practice, embodiments or features of the disclosed subject-matter will now be described, by way of non-limiting example only, with reference to the accompanying drawings, in which.

DETAILED DESCRIPTION

Figure 1:
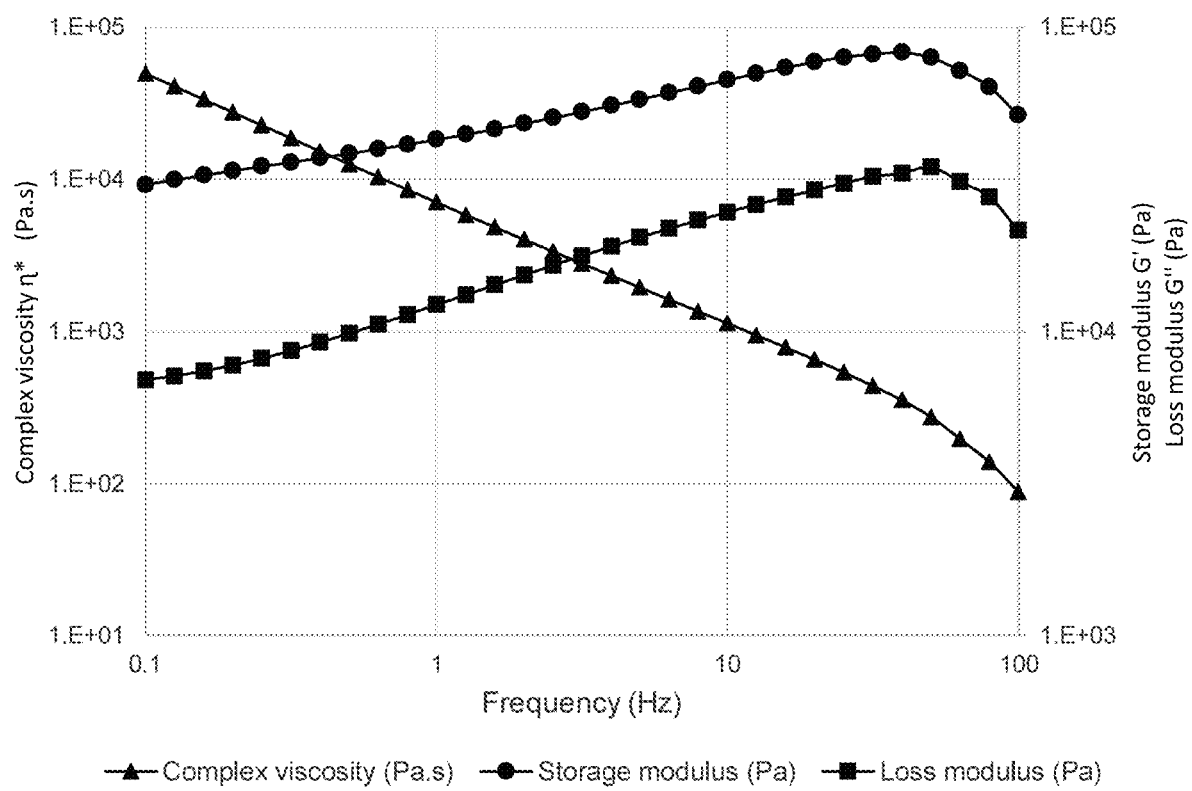
FIG. 1 shows rheological properties of a commercial reference product (Playdoh®), as measured by parallel plate rheometer, according to some embodiments of the disclosure.

As used herein, the singular form "a", "an" and "the" include plural references unless the context clearly dictates otherwise. For example, the term "a rheology modifier" or "at least one rheology modifier" may independently include a plurality of rheology modifiers, including mixtures thereof.

As used herein, the term "about" is meant to encompass deviation of ±10% from the specifically mentioned value of a parameter, such as temperature, concentration, time, etc.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

Throughout this specification and the claims which follow, unless the context requires otherwise, the word "comprise" or any lingual variations thereof, will be understood to imply the inclusion of a stated integer or step or group of integers or steps but not the exclusion of any integer or step or group of integers and steps.

Generally, it is noted that the term ". . . at least one . . ." as applied to any component of a composition of the disclosure should be read to encompass one, two, three, four, five, or more different occurrences of said component in a composition or process of this disclosure.

The term "derivative" as used herein refers to a chemically modified compound derived from the parent compound, that differs from the parent compound by one or more elements, substituents and/or functional groups such that the derivative has the same or similar properties/activities as the parent compound.

As used herein, the term "room temperature" refers to a range of temperature from about 20° C. to about 30° C., for example, about 20° C., about 21° C., about 22° C., about 23° C., about 24° C., about 25° C., about 26° C., about 27° C., about 28° C., about 29° C., or about 30° C.

The present disclosure provides bread-based compositions of playdough having stable and reproduceable properties, manufactured in small scale (for example lab scale) or in an industrial scale from bakery residual with variable qualities. The playdough of the present application advantageously has uniform and robust properties, and has a shelf life of at least 12 months from production.

The playdough composition is based on biodegradable and compostable components, making it potentially suitable for use as a hydroponic or detached growth medium after disposal. Thus, unlike most commercial playdough products that contain synthetic ingredients, eliminating or substantially reducing the potential for composability, the playdough disclosed herein is based on environment friendly ingredients.

Further, the process for production of the playdough composition enables utilization of a variety of the types of bakery residual, without the need for sorting. The process is designed to process all types of bread, sorted or unsorted, regardless of their composition or state, such that the final playdough product has robust and repeatable properties. In addition, as bread is a substrate for proliferation of various mold, fungi and/or yeast, the process permits neutralization or elimination of such contaminants from the bread, as to delay staling of the playdough for a period of at least a few months.

In some embodiments, there is provided a biodegradable playdough composition, comprising at least about 20 wt % bakery residual, at most about 50 wt % water, and at least one functional additive, the biodegradable playdough containing at least about 75 wt % of biodegradable components based on the total weight of the playdough, the biodegradable playdough having a complex viscosity of between about $1×10^4$ and about $1×10^6$ Pa·s (as measured by parallel plates rheometer, at 25° C., at 0.1 Hz).

In some embodiments, there is provided a process of manufacturing a biodegradable playdough containing at least about 75 wt % of biodegradable components based on the total weight of the playdough. The process comprises the steps of:

(a) particulating unsorted bakery residual to an average particle size of at most about 200 µm, thereby obtaining particulated bakery residual;

(b) mixing the particulated bakery residual with at least one functional additive and water to obtain a mixture, and maintaining the mixture at a temperature of at least about 40° C. for a predefined period of time; and (c) cooling the mixture to a room temperature to obtain said biodegradable playdough.

Playdough is a modeling paste, typically soft and pliable, that can temporarily retain its shape once molded, and can be returned to a non-molded form by slight application of pressure (i.e. pressure that can be applied manually).

The term biodegradable refers to a substance or a composition that is capable of being degraded or decomposed by action of microorganisms, e.g. bacteria. The playdough disclosed herein is rendered biodegradable by containing at least 75 wt % of biodegradable components out of its total weight, as defined by at least one of International Standards EN-13432 ("Packaging: requirements for packaging recoverable through composting and biodegradation"), ASTM D6400-19 ("Standard specification for labeling of plastics designed to be aerobically composted in municipal or industrial facilities"), and ISO 17088 ("Specifications for compostable plastics"). In some embodiments, the biodegradable playdough meets the requirements of one or more of International Standards EN-13432, ASTM D6400-19 and ISO 17088.

In some embodiments, the biodegradable playdough comprises at least 77 wt %, at least 80 wt %, at least 82 wt %, or at least 85 wt % of biodegradable components out of its total weight.

According to some embodiments, the biodegradable playdough is also compostable. The term "compostable" as used herein refers to the ability of at least the majority of the playdough's components to be transformed into compost through composting processes. Thus, the playdough of this disclosure can be repurposed as a soil additive or as a detached substrate for growth of vegetation.

The process disclosed herein utilizes unsorted bakery residual from various sources and types, to produce therefrom a playdough, as disclosed herein, that has repeatable and robust properties. Therefore, the process disclosed herein enables recycling or repurposing the bakery residuals or bakery byproducts into a different biodegradable product, for example the playdough, in an industrial scale.

In the compositions and processes of this disclosure, the bakery residuals or bakery byproducts are utilized as a source of proteins and carbohydrates, forming a structural matrix of the playdough.

The term "bakery residual" or "bakery byproduct" throughout the present disclosure may be used interchangeably. This term may refer to "bread waste" such as any baked goods that were not consumed and can be at any state (either in edible or inedible condition). Thus, in some embodiments, this term may also refer to "recycled bread". The term bakery residual, bakery byproduct or bread waste also refers to baked products throughout their production and marketing processes (for example manufacturing leftovers or rejects, production surplus, unsold products, and so forth). The bakery residual can vary, inter alia, in flour type, fiber content, sugars, fats and other additives which are present as baking improvers. In addition, the quality and quantity of gluten proteins typically varies between different types of flours. The term means to encompass all types of baked products which are flour-based, regardless of the types of flour utilized—for example baked products that contains at least one of wheat flour (plain or whole wheat), rye flour, barley flour, spelt flour, rice flour, amaranth flour, buckwheat flour, cassava flour, chickpea flour, corn flour, potato flour, tapioca flour, teff flour, and any mixture thereof The term bakery residual, bakery byproduct or bread waste means to also encompass, as noted, various types of baked goods, for example bread loaves, bread-rolls, cookies, cakes, crackers, wafers, sweet pastries, enriched pastry, savory pastries, and so forth, as well as unbaked or partially baked dough.

In some embodiments, the bakery residual is unsorted bakery residual. In some embodiments, the bakery residual comprises one or more types of bread.

In some embodiments, the process disclosed herein further comprises removal of packaging or wrapping means from the bakery residual prior to further processing. That is to say, the bakery residual can be received from different sources, either in non-packed form or in packed form; such packaging needs to be separated from the bakery residual prior to the particulating step of the process.

As the playdough of this disclosure is predominantly based on the bakery residual as a major component thereof, the mixture, in some embodiments, comprises at least 20 wt % bakery residual. For clarity, the bakery residual may be a mixture of partially or fully baked dough (or baked goods) and one or more types of flours defined above. Non-limiting examples of such mixture include bread loaves (being considered as recycled bread) and corn flour, bread-rolls (as the recycled bread) and corn flour, bread loaves (the recycled bread) and tapioca flour, and bread-rolls (as the recycled bread) and tapioca flour.

In some embodiments, the biodegradable playdough (and/or the mixture at step (b)) comprises at least 20 wt % bakery residual. In some embodiments, the playdough (and/or the mixture at step (b)) comprises at least 30 wt %, at least 40 wt %, at least 50 wt % or at least 60 wt % of bakery residual. According to some embodiments, the biodegradable playdough (and/or the mixture at step (b)) comprises between about 20 wt % and 80 wt % of bakery residual. In some embodiments, the biodegradable playdough (and/or the mixture at step (b)) comprises between about 30 wt % and 75 wt % of bakery residual. In some embodiments, the biodegradable playdough (and/or the mixture at step (b)) comprises between about 45 wt % and 80 wt % of bakery residual.

The biodegradable playdough further comprises up to 60 wt % water. In some embodiments, the playdough comprises between about 10 wt % and about 60 wt % water. By way of example, the playdough of the present disclosure comprises about 10 wt %, 20 wt %, 30 wt %, 40 wt %, 50 wt %, or 60 wt % water. According to some embodiments, the weight ratio of bakery residual to water in the playdough is between about 0.5:1 and 8:1. According to some other embodiments, the weight ratio of bakery residual to water in the playdough is between about 1:1 and 8:1. In some embodiments, the weight ratio of bakery residual to water in the playdough is about 2:1, 3:1, 4:1, 5:1 or 6:1.

The bakery residual is particulated at step (a) of the process to obtain particulated bakery residual. In some embodiments, the particulated bakery residual has an average particle size of no more than about 200 μm, for example between about 1 μm and about 100 μm, or between about 1 μm and about 50 μm. The term average particle size refers to the arithmetic mean of measured diameters of the bread particles. As typically the bread particles can be spherical or non-spherical, the average particle size is calculated on the basis of diameter or the longest dimension, respectively, of the particle. In some embodiments, the particulated bakery residual may be made of bakery residual having an average particle size of 100 μm. In some embodiments, the particulated bakery residual may be made of bakery residual having an average particle size of 200 μm. In some embodiments, the particulated bakery residual may be made of a mixture of the bakery residual having an average particle size of 100 μm and the bakery residual having an average particle size of 200 μm. In some embodiments, the weight ratio of the bakery residual having an average particle size of 100 μm and the bakery residual having an average particle size of 200 μm may be adjusted accordingly for example 2:1, 1:1, or 1:2. Other suitable ratio may also be used.

According to some embodiments, the particulating can be carried out by a suitable method that permits size diminution of the waste bread. Non-limiting examples of such size reduction method include grinding, milling, ball-milling, crushing, grating, pulverizing, shaving, flaking, granulating, shredding and so forth.

According to some embodiments, the process further comprises a step (a0), prior to step (a), comprising drying the unsorted bakery residual to a moisture quantity of less than about 10 wt % (for example about 1 wt %, 2 wt %, 3 wt %, 4 wt %, 5 wt %, 6 wt %, 7 wt %, 8 wt %, or 9 wt %) to obtain substantially dried unsorted bakery residual. The dried unsorted bakery residual can then be particulated.

Drying the unsorted bakery residual permits better control over the process parameters in spite of utilizing various and differing types of baked goods constituting the bakery residual. However, when the bakery residual is received at a proper water content (for example below 10 wt % including 9 wt %, 7 wt %, 5 wt % or lower) no further drying may be required.

In some embodiments, step (a) of the process comprises wet-particulation of the unsorted bakery residual. In such embodiments, the unsorted bakery residual is first mixed with an initial quantity of water, and then ground under wet conditions in order to obtain a slurry of bread particles dispersed in water. It is noted that the initial quantity of water can be a portion of or the entire amount of water in the composition.

According to some embodiments, steps (a) and (b) of the process can be carried out sequentially or concomitantly.

In some embodiments, wherein step (b) comprises (b1) mixing said particulated bakery residual with at least one functional additive to obtain a blend; and followed by (b2) mixing said blend with said water to obtain said mixture. In some embodiments, step (b2) comprises mixing said blend with a solution containing at least one functional additive. In some embodiments, said solution comprises the at least one functional additive substantially dissolved in water. In some embodiments, the solution comprises one or more salts. In some embodiments, the one or more salts is NaCl, $CaCl_2$ or mixture thereof.

In some embodiments, water added in step (b) or (b2) of the process is water heated to a temperature of between about 40° C. and about 100° C., for example about 40° C., 50° C., 60° C., 70° C., 80° C., 90° C., or 100° C. Any other values between this range may also be used.

The biodegradable playdough comprises at least one functional additive. Within the context of this disclosure, the term functional additive refers to a compound or composition added to the playdough composition (in step (b) of the process) and bestows one or more properties, or modifies one or more properties, of the playdough. According to some embodiments, said at least one functional additive is selected from the group consisting of rheology modifiers, mycotoxin scavengers, retrogradation preventing agents, colorants, odorants, antioxidants, odor masking agents, preservatives, and any mixture or combination thereof The one or more functional additives can, in some embodiments, be by-products of industrial food processing, for example recycled components. In some embodiments of the disclosure, the one or more functional additives may have more than one functionality (or use). In an exemplary embodiment, a functional additive may act as both rheology modifier and retrogradation preventing agent. In another exemplary embodiment, a functional additive may act as both rheology modifier and preservative.

The quality of the playdough is often defined by its rheology properties; namely, it should be elastic enough to enable ease of handling while molding, and plastic enough to prevent the dough from tearing during use. The ratio between elasticity and plasticity determines the rheological properties of the playdough. Typically, changes in composition of the playdough can have a dramatic effect on its rheological properties, hence making the use of non-homogenous bakery residual with variable compositions, challenging. In addition, baking processes of the bread cause starch and flour derived protein (gluten) in bread to undergo gelatinization and coagulation, respectively, to eventually function as water binding agents. Hence, unlike starches utilized in some commercial types of playdough, the bread-originating starches and gluten do not function as elasticity providers, but rather as water-binding agents, that can reduce elasticity of the biodegradable playdough. As disclosed herein, the processes and compositions of this disclosure are designed to overcome this challenge and provide playdough with robust properties even though utilizing variable bakery residual.

Thus, according to some embodiments, at least one of the functional additives in the playdough is a rheology modifier. The term rheology modifier refers to a compound or composition that changes (typically improves) the rheological properties of the playdough. The rheology modifier can change one or more of elasticity of the playdough, plasticity of the playdough, viscosity of the playdough, hardness of the playdough, and other properties. The rheology modifier(s) may also function to provide soft and smooth sensorial properties, which are important for playdough intended to be used by infants and children.

In some embodiments, said rheology modifiers are selected from the group consisting of one or more of gluten and gluten derivatives, starch and starch derivatives, vegetable oils, mineral oils, waxes, polysaccharides, and any mixture thereof. In some embodiments, to ensure sustainability, the rheology modifiers used in the present disclosure are obtained from renewable resources. In an exemplary embodiment, vegetable oils are preferred over mineral oils.

In some embodiments, the rheology modifiers are added to the mixture in an amount of between about 1 and about 20 wt % (for example about 1, 2, 3, 5, 8, 10, 12, 15, or 20 wt %). In some embodiments, the biodegradable playdough composition comprises between about 1 and about 20 wt % of rheology modifier(s).

According to some embodiments, gluten is added to the mixture during production of the playdough as a rheology modifier. In such embodiments, the content of gluten added to the mixture is between about 1 wt % and about 8 wt % for example 2 wt %, 3 wt %, 4 wt %, 5 wt %, 6 wt %, 7 wt %, or 8 wt %. Without wishing to be bound by theory, the added gluten provides the playdough with higher elasticity, while reducing dependence on the variable protein quality in the recycled bread. In some embodiments, when the recycled bread is a non-gluten bread (or a gluten free bread), the gluten may be substituted by one or more polysaccharides, for example, amylopectin. Advantageously, when gluten is substituted by amylopectin, the playdough composition of the present disclosure may exhibit better or desirable properties including less firm thus easier to play. When amylopectin is used to substitute gluten, amylopectin added to the mixture is typically between about 1 wt % and about 8 wt % for example 2 wt %, 3 wt %, 4 wt %, 5 wt %, 6 wt %, 7 wt %, or 8 wt %.

According to some embodiments, elasticity of the playdough disclosed hereinmay be increased by adding one or more starches and/or modified starches. In such embodiments, starch and/or starch derivatives are added to the mixture as rheology modifiers in an amount of between about 0.5 wt % and about 20 wt % for example about 1 wt %, 2 wt %, 5 wt %, 10 wt % or 15 wt %.

In some embodiments, said starch and starch derivatives may be selected from the group consisting of acid tread starch, alkaline modified starch, bleached starch, oxidized starch, mono-starch phosphate, di-starch phosphate, 16hosphate di-starch phosphate, acetylated di-starch phosphate, acetylated starch, mono-starch acetate, acetylated di-starch adipate, di-starch glycerin, hydroxypropyl-starch, hydroxypropyl di-starch glycerin, hydroxypropyl di-starch phosphate, starch sodium octenyl succinate, acetylated oxidized starch, dextrin, and any mixture thereof In some embodiments, the starch or starch derivatives may be supplemented (used in conjunction) with waxy-maize-starch or amylopectin.

The starch, in some embodiments, can be of any source, typically a plant-based source, for example corn starch, potato starch, rice starch, wheat starch, cassava starch, and so forth. The starch, in some embodiments, is recycled starch that is recycled from food processing and/or food products.

According to some embodiments, one or more mineral oils, vegetable oils and/or waxes can additionally be used as rheology modifiers. In such embodiments, the vegetable oil is selected from a group consisting of soybean oil, rapeseed oil, safflower oil (canola), sunflower oil, peanut oil, cottonseed oil, coconut oil, palm oil, olive oil, rice-bran oil, grapeseed oil, avocado oil, sesame oil, hemp oil, almond oil, and any mixture thereof. In some embodiments, the wax can be selected from the group consisting of bees' wax, soy wax, carnauba wax, candelilla wax, jojoba wax, rice bran wax, and any mixture thereof.

In some embodiments, a biodegradable emulsifier, alone or in combination with other rheology modifier, can be used as rheology modifier. In some embodiments, the biodegradable emulsifiers are selected from the group consisting of one or more of mono- and di-glycerides of fatty acids, sodium stearoyl lactylate, calcium stearoyl lactylate, diacetyl tartaric acid ester of mono- and di- glycerides of fatty acids, glycerol monostearate (GMS), and any mixture thereof. In some embodiments, the emulsifier may be selected from an anionic surfactant, a cationic surfactant or a nonionic surfactant.

Bakery residual typically varies in its microbial quality depending on shelf-life and storage conditions of the bakery residual, as well as the types of preservatives used and their efficiency against molds. Hence, recycling of bakery residual is challenging not only because of its poor visual appearance and non-homogenous properties, but also due to its ability to produce mycotoxins. Typical molds that grow on bread include, inter alia, various species of *Aspergillus, Penicillium, Fusarium, Mucor, Rhizopus,* and others. In order to reduce or eliminate such contaminants from the playdough, as well as to prevent growth thereof for a substantial period of time (e.g. at least a few months), the bakery residual, sorted or unsorted, may be dried to remove or at least reduce the moisture thus reducing the growth of the molds or mold spores present in the bread as described above.

In order to facilitate the mixing of the bakery residual, the at least one functional additive as well as water and to facilitate the formation of the playdough , the mixture is maintained at a temperature of at least 40° C. (for example 50° C., 55° C., 60° C., 65° C., 70° C. or higher) in step (b) of the process of this disclosure, for a period of time. In some embodiments, the mixture is maintained in step (b) at a temperature of between about 40° C. and about 90° C. (for example 40° C., 60° C., 70° C., 80° C., or 90° C.).

According to some embodiments, the mixture is maintained at such temperatures for a period of time of at least about 5 minutes, for example at least about 10 minutes, about 20 minutes or about 30 minutes.

In addition, one or more mycotoxin scavengers can be added as functional additives, to prevent or suppress formation of mycotoxins in the playdough. According to some embodiments, said mycotoxin scavengers are selected from the group consisting of active carbon, aluminosilicates, zeolites, phyllosilicates, cellulose, cellulose derivatives (for example hydroxyethyl cellulose, methyl cellulose, hydroxypropylmethyl cellulose, etc.), and any combination thereof Use of such scavengers can also reduce or eliminate any foul odors that may develop upon growth of undesired mold contaminants in the playdough.

According to some embodiments, said one or more mycotoxin scavengers are added to the mixture in an amount of between about 0.5 wt % and about 5 wt %, preferably between about 0.5 wt % and about 3 wt %.

According to some embodiments, the biodegradable playdough of the present disclosure has mycotoxins stability (i.e. does not substantially develop mycotoxins) for a period of at least 3 months from its manufacture, typically for at least 6 moths from manufacture, or even for at least 9 months from manufacture.

Another challenge in recycling bread waste or bakery residual is that bread undergoes staling or retrogradation over time. Staling or firming causes baked goods to lose their freshness. Although providing a sense of dryness and associated mistakenly to moisture loss, staling is caused by changes in starch structure. The starch in wheat flour is made up of straight and branched chains contained in granules; during baking, the starch granules swell, and the straight chains diffuse out. As the bread cools, the straight chains link together to provide the loaf's initial shape and strength. The branched chains of starch remain in the granules during baking and link together slowly during storage to make the crumb increasingly firmer with time. Such retrogradation is undesired in the biodegradable playdough, as retrogradation can cause the playdough to harden over time due to starch recrystallization.

Hence, in some embodiments, retrogradation preventing agents are added to the playdough as a functional additive. In such embodiments, the retrogradation preventing agent is selected from the group consisting of one or more of biodegradable emulsifiers, biodegradable polysaccharides, oils (for example vegetable oils), and any combination thereof.

In some embodiments, the biodegradable emulsifiers are selected from the group consisting of one or more of mono- and di-glycerides of fatty acids, sodium stearoyl lactylate, calcium stearoyl lactylate, diacetyl tartaric acid ester of mono- and di-glycerides of fatty acids, glycerol monostearate (GMS), and any mixture thereof. In some embodiments, the emulsifier may be selected from an anionic surfactant, a cationic surfactant or a nonionic surfactant. Advantageously, the emulsifier may function as a compatibilizer of oil and water phases present in the mixture when ingredients to make the playdough composition are mixed. When the emulsifier is added, a more stable and thus homogeneous mixture may be obtained.

In some embodiments, the emulsifier including the biodegradable emulsifier may have a dual functionality. In an exemplary embodiment, the emulsifier including the biodegradable emulsifier may act as both rheology modifier and retrogradation preventing agent.

In embodiments, the biodegradable polysaccharides are selected from the group consisting of one or more of algin, pectin, carrageenan, xanthan gum, guar gum, agar, cellulose, locust bean gum, gellan gum, gelatin, amylopectin, starch (different than the starch utilized as a rheological modifier), and any mixture thereof In some embodiments, the retrogradation preventing agents can be one or more oils (for example vegetable oils and non-vegetable oils including mineral oils) In some embodiments, the vegetable oil can be selected from the group consisting of soybean oil, rapeseed oil, safflower oil (canola), sunflower oil, peanut oil, cottonseed oil, coconut oil, palm oil, olive oil, rice-bran oil, grapeseed oil, avocado oil, sesame oil, hemp oil, almond oil, and any mixture thereof In an exemplary embodiment, the oil (for example vegetable oils) may have a dual functionality as both retrogradation preventing agent and rheology modifier.

According to some embodiments, the total content of said one or more retrogradation preventing agents is between about 1 wt % and about 12 wt %. In some embodiments, the one or more retrogradation preventing agents is between about 2 wt % and about 10 wt % of the total weight of the playdough.

According to some embodiments, the biodegradable playdough has staling stability (i.e. does not undergo substantial staling) for a period of at least 3 months from its manufacture, typically for at least 6 moths from manufacture, or even for at least 9 months from manufacture.

In some embodiments, one or more antioxidants may be added as a functional additive to the playdough. Without wishing to be bound by theory, the antioxidants prevent or delay oxidation of lipids in the bread, which can result in degradation of the mechanical properties of the playdough as well as to formation of off-odors. According to some embodiments, the antioxidant is selected from the group consisting of tocopherol or α-tocopherol (vitamin E), phytic acid, rosemary extract, ascorbic acid, butylated hydroxyanisole (BHA), butylated hydroxytoluene (BHT), tert-butylhydroquinone (TBHQ), propyl gallate, and any mixture thereof.

In some embodiments, step (b) further comprises adding at least one salt into the mixture. Typically, said salt is added in an amount of between about 5 and about 30 wt % (for example about 8 wt %, 10 wt %, 15 wt %, 20 wt %, or 25 wt %). In some embodiments, the salt may be inorganic or organic salt. In some embodiments, the salt can be selected from the group consisting of sodium chloride (NaCl), calcium chloride ($CaCl_2$), and mixtures thereof It can be appreciated that other suitable salts may also be added as a substitute of the salt mentioned above or used in conjunction with NaCl and/or $CaCl_2$. In some embodiments, when NaCl is used in conjunction with $CaCl_2$ as co-salt, the addition of the two salts may alter the mechanical properties of the resulting playdough composition (for example, to provide a smooth surface). $CaCl_2$ may advantageously maintain the moisture or hydration level of the playdough composition as it prevents or at least reduces the water evaporation. In an exemplary embodiment, when both NaCl and $CaCl_2$ is used, the ratio (w/w) of NaCl and $CaCl_2$ may be 20:80, 40:60, 50:50, 60:40 or 80:20.

Further functional additives can be added for aesthetic purposes or for bestowing the biodegradable playdough with a desired fragrance. According to some embodiments, one or more colorants are added as a functional additive, which can typically be natural pigments (for example pigments from a natural source). The colorant can, in some embodiments, be selected from the group consisting of carotenoids, anthocyanins, betalains, chlorophyll, calcium carbonate, clay, bentonite, earth minerals, titanium (IV) oxide or titanium dioxide and any possible mixture thereof In some embodiments, the concentration of the one or more colorants may be between about 0.5 wt % to about 5 wt %.

One or more odorants, in some embodiments, can be selected from natural essential oils, natural spices, synthetic (for example biotechnology derived) aromatic compounds, and others. One or more odor masking agents can also be used. Non-limiting examples of the odor masking agents include biodegradable fragrance, zeolites, biochar, mineral powders, and so forth.

The playdough can also contain textural additives, such as fine colored particles, glitter particles, shimmer particles, to provide further textural and visual effect.

Preservatives can be added to the playdough to prevent or delay proliferation of undesired microbial contamination caused by molds, yeast or bacteria. The preservatives, in some embodiments, are selected from the group consisting of benzoic acid and salts thereof, sorbic acid and salts thereof, caprylic acid, glyceryl caprylate, sorbitan caprylate, methylparaben, ethylhexylglycerin, phenethyl alcohol, maltol, or any mixture thereof.

As noted, the biodegradable playdough has a complex viscosity of between about $1 \times 10^4$ and about $1 \times 10^6$ Pa·s (as measured by parallel plates rheometer, at 25° C., at 0.1 Hz). The term complex viscosity is the frequency-dependent viscosity of a material when subjecting this material to oscillatory shear stress. In other words, the complex viscosity is the total resistance of a material to flow when oscillating sheer forces are applied thereon. Unless specifically noted otherwise, the complex viscosity values in this disclosure are provided via measurement by parallel plates rheometer, at 25° C., at 0.1 Hz.

In some embodiments, the complex viscosity of the playdough disclosed herein is between about $1\times10^4$ and about $1\times10^6$ Pa·s.

The process, in some embodiments, further comprising a step (d), following step (c), comprises adding at least one secondary additive to the mixture. The secondary additive is different from the at least one functional additive of step (b). In some embodiments, the secondary additive is selected from the group consisting of rheology modifiers, mycotoxin scavengers, retrogradation preventing agents, colorants, odorants, antioxidants, odor masking agents, preservatives, and any mixture or combination thereof.

The addition of the secondary additives in step (d) is carried out by mixing the secondary additives into the mixture obtained in step (c). In some embodiments, the mixing in step (d) is carried out by extrusion.

In some embodiments, in order to adjust the texture and/or viscosity of the resulting mixture (i.e. after mixing the secondary additives into the mixture obtained in step (c), step (d) further comprises adding water to the mixture.

To obtain uniformity of mechanical and elasticity properties to the non-homogenous bakery residual, one or more enzymes can be added to the mixture at or before step (b) of the process. Hence, in some embodiments, the process comprises a step (a1) between steps (a) and (b) that comprises adding one or more enzymes to the mixture to permit at least partial enzymatic decomposition of at least starch and/or gluten present in the bakery residual. Addition of the enzyme(s) causes at least partial enzymatic decomposition of at least starch and/or gluten present in the bakery residual, thereby enabling better control over the properties of the mixture during and post production. According to some embodiments, said one or more enzymes are selected from the group consisting of amylases, proteases, and any mixture thereof.

As some types of bread contain whole grains, nuts, seeds, herbs, and so forth, which can hinder the texture of the playdough, removal of such undesired particles can be carried out. Therefore, according to some embodiments, the process further comprises step (b'), between steps (b) and (c), step (b') comprises filtering (or sieving) said mixture to remove contaminants therefrom. Filtering (or sieving) can be carried out using any suitable separation technique.

After obtaining the biodegradable playdough, the process can comprise further processing step, such as portioning, shaping, wrapping, packaging, and others. In some embodiments, this disclosure provides a biodegradable playdough obtained by the process described herein.

In some embodiments of the disclosure, there is provided a biodegradable playdough composition, comprising at least about 20 wt % bakery residual, at most about 50 wt % water and at least one functional additive, the biodegradable playdough containing at least 75 wt % of biodegradable components based on the total weight of the playdough, the biodegradable playdough composition having a complex viscosity of between about $1\times10^4$ and about $1\times10^6$ Pa·s (as measured by parallel plates rheometer, at 25° C., at 0.1 Hz). In some embodiments, the complex viscosity of the playdough disclosed herein is between about $1\times10^4$ and about $5\times10^5$ Pa·s (as measured by parallel plates rheometer, at 25° C., at 0.1 Hz). In some embodiments, the complex viscosity of the playdough disclosed herein is between about $1\times10^4$ and about $8\times10^5$ Pa·s (as measured by parallel plates rheometer, at 25° C., at 0.1 Hz). In some embodiments, the complex viscosity of the playdough disclosed herein is between about $2\times10^4$ and about $8\times10^5$ Pa·s (as measured by parallel plates rheometer, at 25° C., at 0.1 Hz).

In some embodiments, this disclosure provides a biodegradable playdough composition, comprising at least about 20 wt % bakery residual, at most about 50 wt % water, at least one mycotoxins scavenger, at least one rheology modifier, and optionally at least one functional additive (different from said mycotoxins scavenger and rheology modifier), the biodegradable playdough containing at least 75 wt % of biodegradable components based on the total weight of the playdough, the biodegradable playdough composition having a complex viscosity of between about $1\times10^4$ and about $1\times10^6$ Pa's (as measured by parallel plates rheometer, at 25° C., at 0.1 Hz).

In some embodiments, the disclosure provides a kit comprising one or more portioned quantities of playdough as defined herein, and at least one organoleptic additive.

The term "portioned quantity" as used herein refers to a portion of playdough quantity for single or multiple use by a user. The portioned amount can, for example, be 50 grams, 100 grams, 200 grams, 300 grams, and so forth. The kit can comprise a single portioned quantity, two or more portioned quantities. Each of the portioned quantities can be individually packaged within the kit, e.g. to maintain separation therebetween.

As used herein, the term "organoleptic additive" refers to one or more materials or compositions that can be added to the playdough during use in order to provide one or more textural, visual or odorant effect. For example, the organoleptic additive can be any one of a colorant, a pigment, a perfume, a fragrance concentrate, particulate additive (e.g. fine particles to provide a textural effect), and so forth. The kit can comprise at least such organoleptic additive, two or more different organoleptic additives.

In some embodiments, the disclosure provides a kit comprising two or more portioned quantities of playdough, said two or more portioned quantities differing from one another by at least one property.

In some embodiments, said property can be any one of color, scent, texture, viscosity, hardness, softness, smoothness, etc.

The kits of this disclosure can further comprise instructions for use.

The kits of this disclosure can further comprise one or more molds, templates, cutters, shaping tools, and so forth.

EXAMPLES

Reference Commercial Product

The Playdoh® commercial product was used as a reference for assessing the rheological properties of compositions of the present disclosure.

The rheological properties of a sample of Playdoh® were measured by a parallel plate rheometer (Discovery HR-1, T.A. Instruments, USA), with plates' diameter of 25 mm, dynamic mode. All measurements were carried out at 25° C. The frequency sweep of oscillation was over the range of 0.1-100 Hz. The rheological properties of Playdoh® are shown in FIG. 1.

As can be seen, the rheological behavior of Playdoh® is of a pseudoplastic, sheer-thinning liquid, in which the complex viscosity is decreasing with increase of shear rate applied onto the sample.

Example 1

Figure 2A:
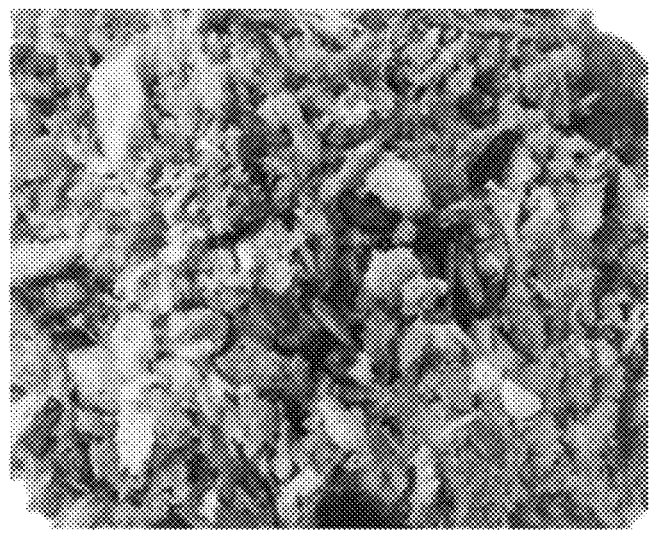
FIGS. 2A-2B show unsorted bakery residual: as received (FIG. 2A), and after drying and grinding (FIG. 2B), according to some embodiments of the disclosure.
Figure 2B:
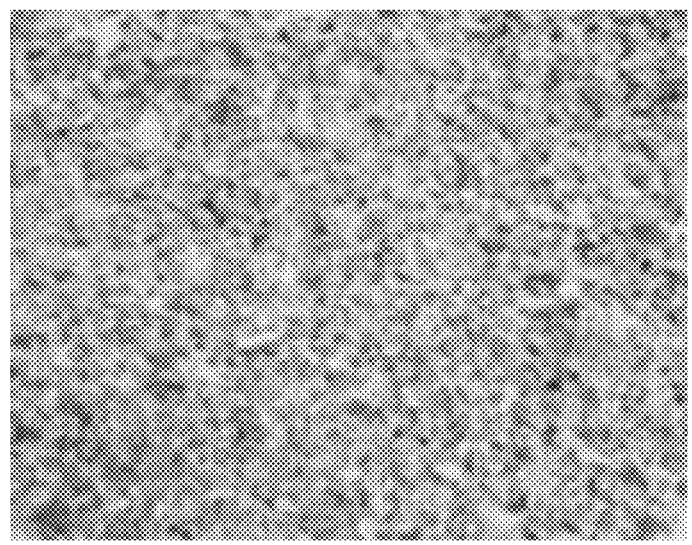
Figure 3A:
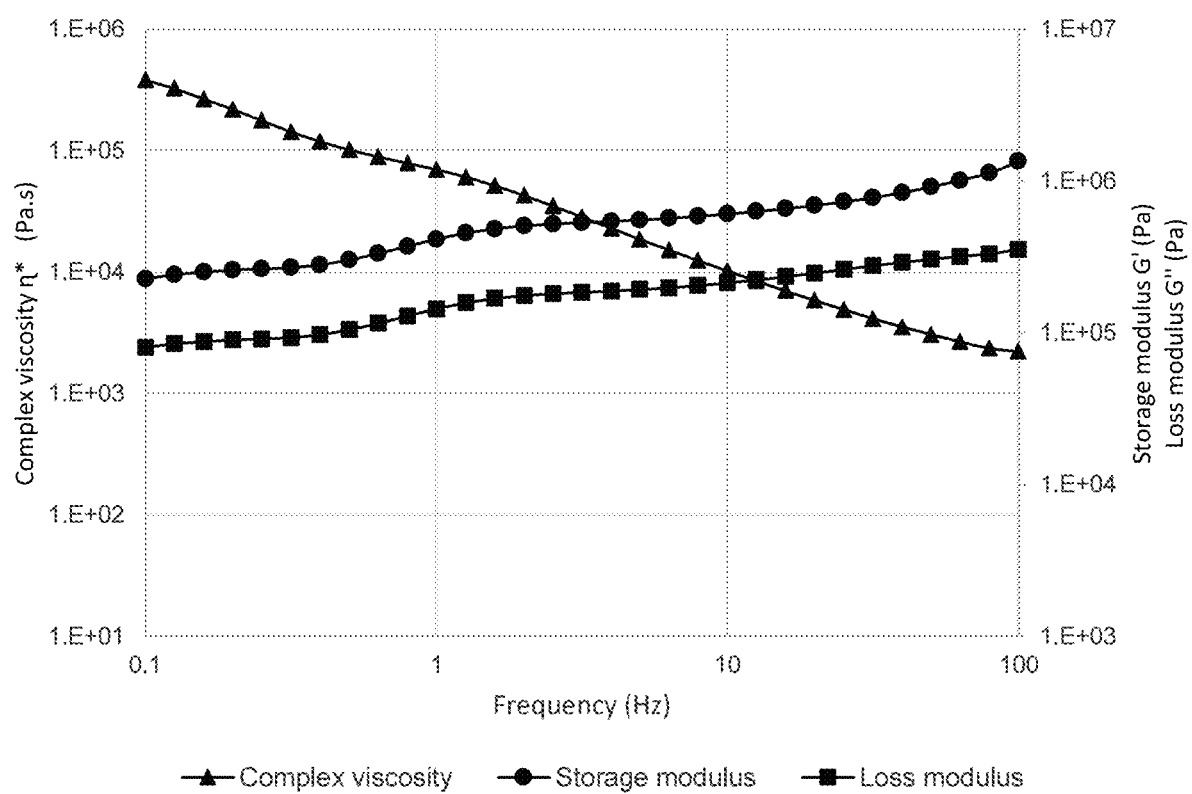
FIGS. 3A-3B show rheological properties of Compositions 1 and 2, respectively, according to Example 1, as measured by parallel plate rheometer, according to some embodiments of the disclosure.
Figure 3B:
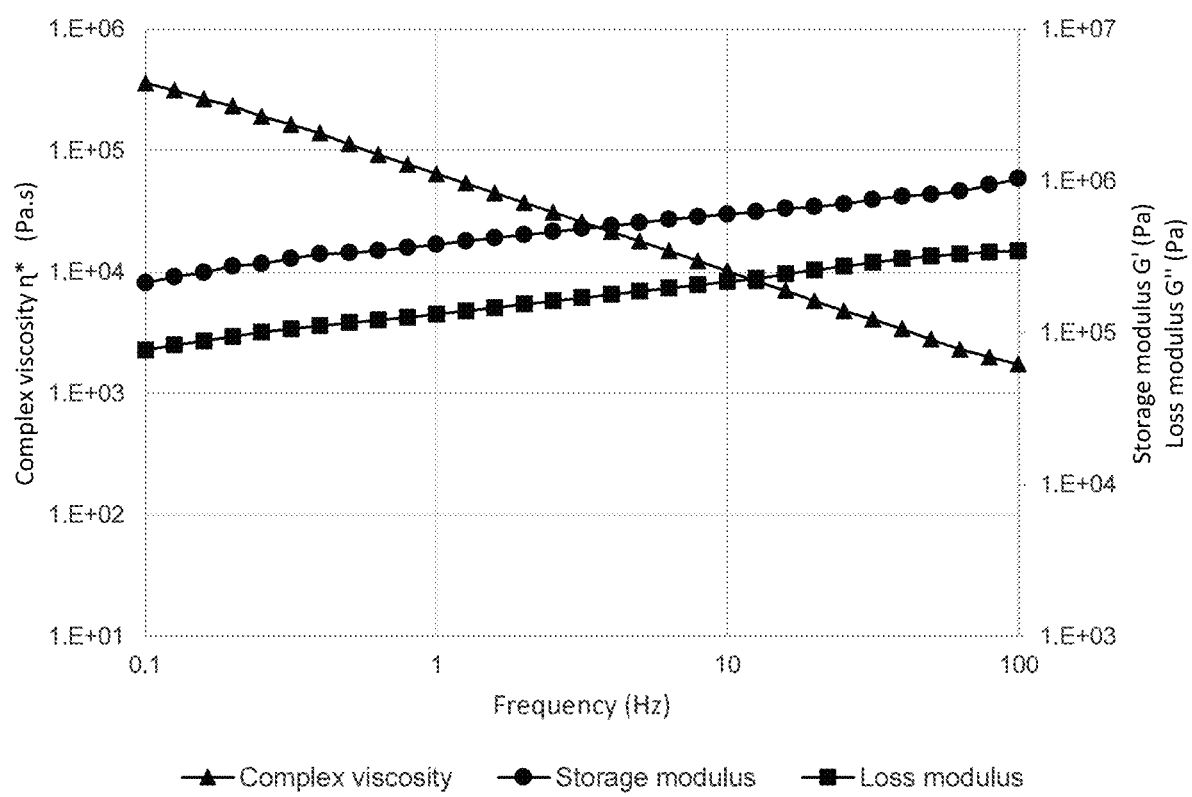

Unsorted bakery residual (FIG. 2A) was dried and particulated (FIG. 2B) to a particle size of at most 400 μm. The dried and particulated bakery residual was mixed with rheology modifiers, retrogradation preventing agents, and preservatives according to the compositions shown in Table 1A, until obtaining a homogenous initial mixture. Sodium chloride salt was dissolved in warm water)(~70° to obtain a salt solution. The initial mixture was placed in a mixing bowl in a warm water bath, and the salt solution was added gradually, under mixing conditions. The mixture was mixed for at least 10 minutes, until the temperature of the composition reached about 55-60° C. The playdough was then left to cool to room temperature. The rheological properties for compositions 1 and 2 are shown in FIGS. 3A and 3B, respectively and Table 1B. The test method and parameters were identical to those of the Reference.

As can be seen, both Compositions 1 and 2 behave as pseudoplastic liquids, however with a complex viscosity larger in an order of magnitude, as compared to the Reference. Compositions 1 and 2 were, accordingly, somewhat harder to manually knead.

TABLE 1A

Compositions of Example 1

| Component | Concentration wt % | | Functionality |
|---|---|---|---|
| | Comp. 1 | Comp. 2 | |
| Unsorted bakery residual | 48.77 | 47.3 | Dough matrix, rheology |
| Water | 23.47 | 18.5 | Dough matrix, rheology |
| GMS | 4.39 | 4.5 | Elasticity, retrogradation prevention |
| Gluten | 4.01 | 3.1 | Rheology modifier |
| Vegetable oil | 1.43 | 1.5 | Elasticity, retrogradation prevention |
| Potato starch | 1.28 | 1.5 | Dough elasticity |
| Methylparaben | 0.25 | 0.2 | Preservative (food grade) |
| NaCl | 16.41 | 23.7 | |

* Glyceryl monostearate, 40% pre-melted

TABLE 1B

Rheological test results

| | Complex viscosity [log(Pa · sec)] | | |
|---|---|---|---|
| Composition | 0.1 Hz | 1 Hz | 10 Hz |
| 1 | 5.58 | 4.84 | 4.01 |
| 2 | 5.56 | 4.81 | 4.01 |
| Reference | 4.7 | 3.85 | 3.06 |

Example 2

Figure 4:
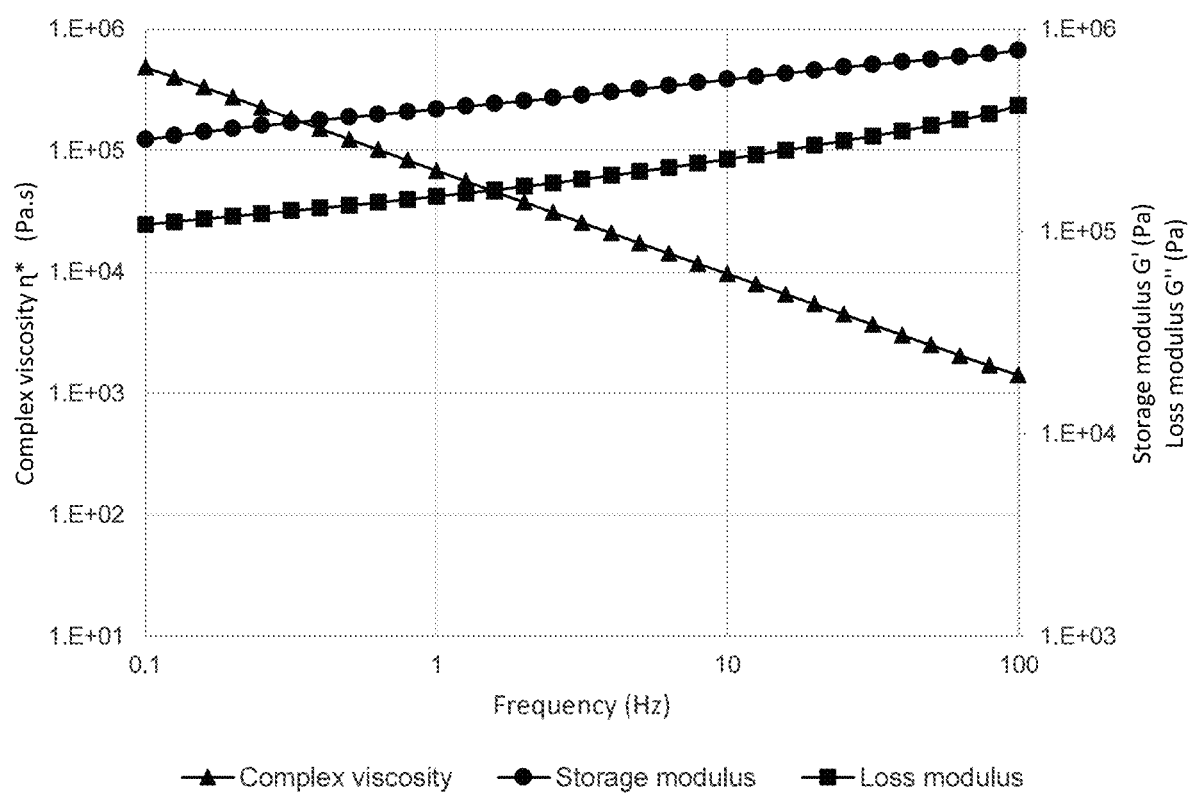
FIG. 4 shows rheological properties of Composition 3, according to Example 2, as measured by parallel plate rheometer, according to some embodiments of the disclosure.

Unsorted, dried and particulated bakery residual was mixed with rheology modifiers, retrogradation preventing agents, preservatives and salt until obtaining a homogenous mixture, according to the composition shown in Table 2A. The mixture was placed in a mixing bowl in a warm water bath (~90° C.), and water was added gradually under mixing conditions for at least 10 minutes, until the temperature of the composition reached about 55-60° C. The playdough was then left to cool to room temperature, covered. The following day, 10 ml of warm water (55-60° C.) were mixed into the playdough until a homogenous paste was obtained. The rheological properties for composition 3 are shown in FIG. 4 and Table 2B.

As can be seen, Composition 3 also behaves as pseudoplastic liquids, however with a complex viscosity larger in an order of magnitude, as compared to the Reference.

TABLE 2A

Composition of Example 2 (composition 3)

| Component | Concentration wt % | Functionality |
|---|---|---|
| Unsorted bakery residual | 35.5 | Dough matrix, rheology |
| Water | 40.3 | Dough matrix, rheology |
| GMS | 4.5 | Elasticity, retrogradation prevention |
| Gluten | 3.1 | Rheology modifier |
| Vegetable oil | 1.5 | Elasticity, retrogradation prevention |
| Potato starch | 1.5 | Dough elasticity |
| Methylparaben | 0.2 | Preservative (food grade) |
| Sodium chloride | 23.7 | |

* Glyceryl monostearate, 40% pre-melted

TABLE 2B

Rheological test results

| | Complex viscosity [log(Pa · sec)] | | |
|---|---|---|---|
| Composition | 0.1 Hz | 1 Hz | 10 Hz |
| 3 | 5.68 | 4.83 | 3.99 |
| Reference | 4.7 | 3.85 | 3.06 |

Example 3

Figure 5A:
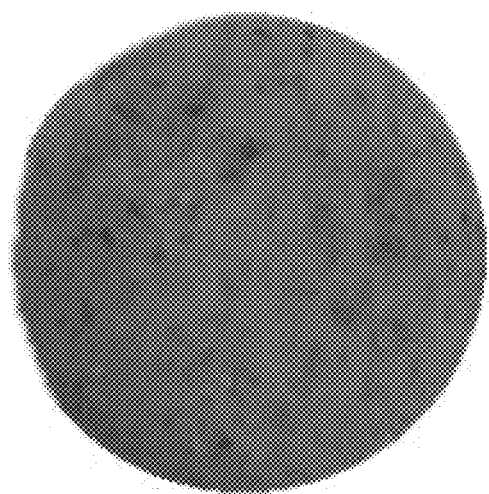
FIGS. 5A-5B show the biodegradable playdough of one of the compositions in Example 3, according to some embodiments of the disclosure.
Figure 5B:
Figure 6A:
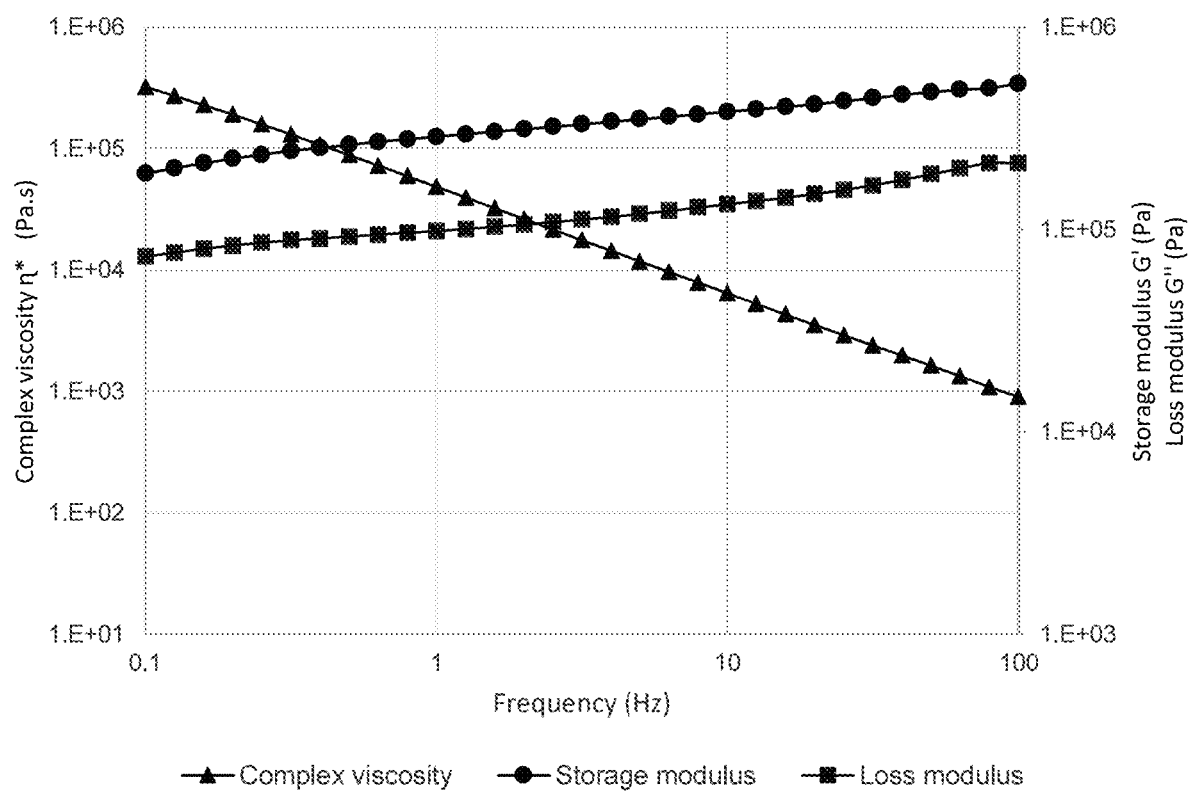
FIGS. 6A-6E show rheological properties of Compositions 4-8, respectively, according to Example 3, as measured by parallel plate rheometer, according to some embodiments of the disclosure.
Figure 6B:
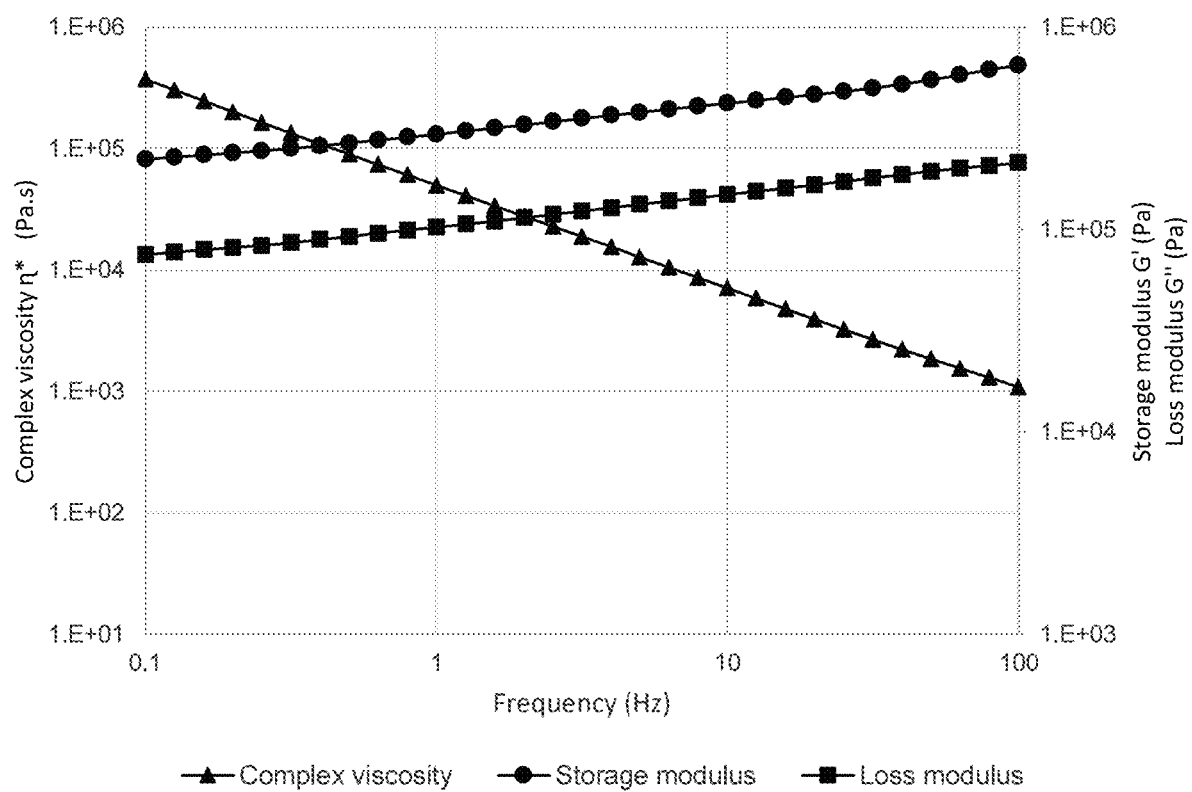
Figure 6C:
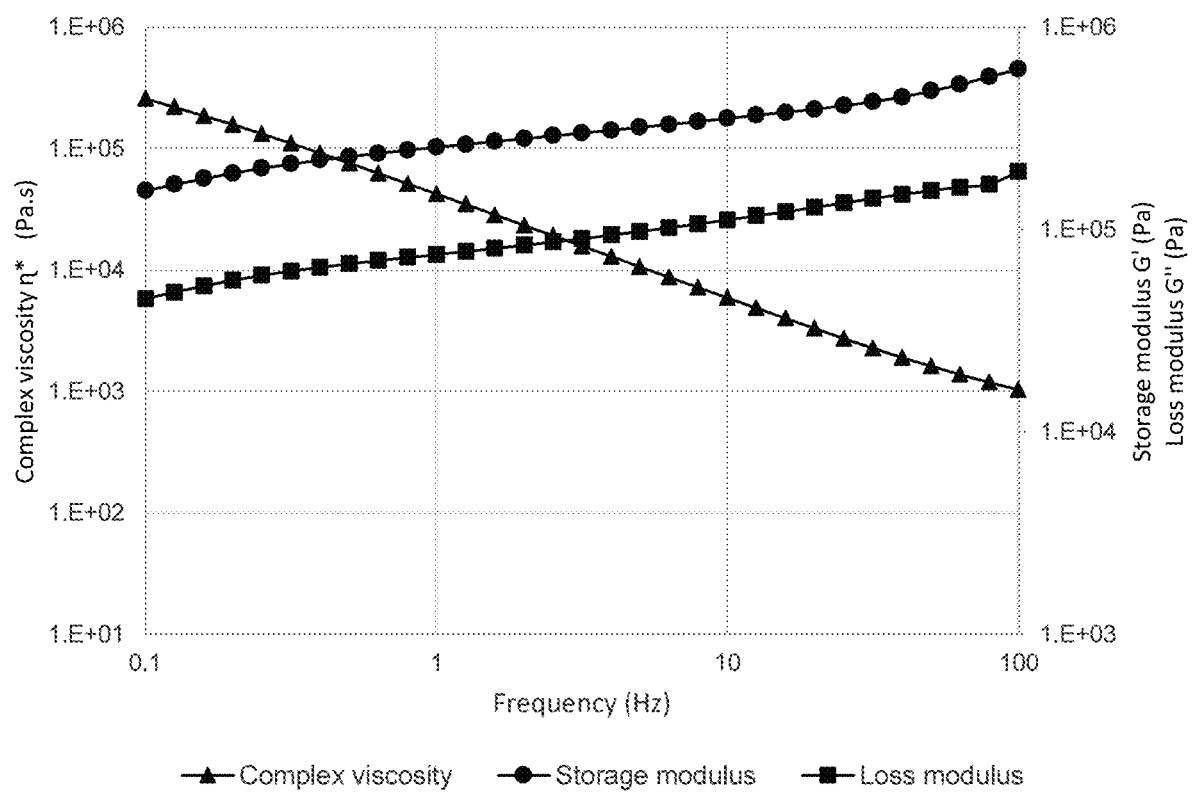
Figure 6D:
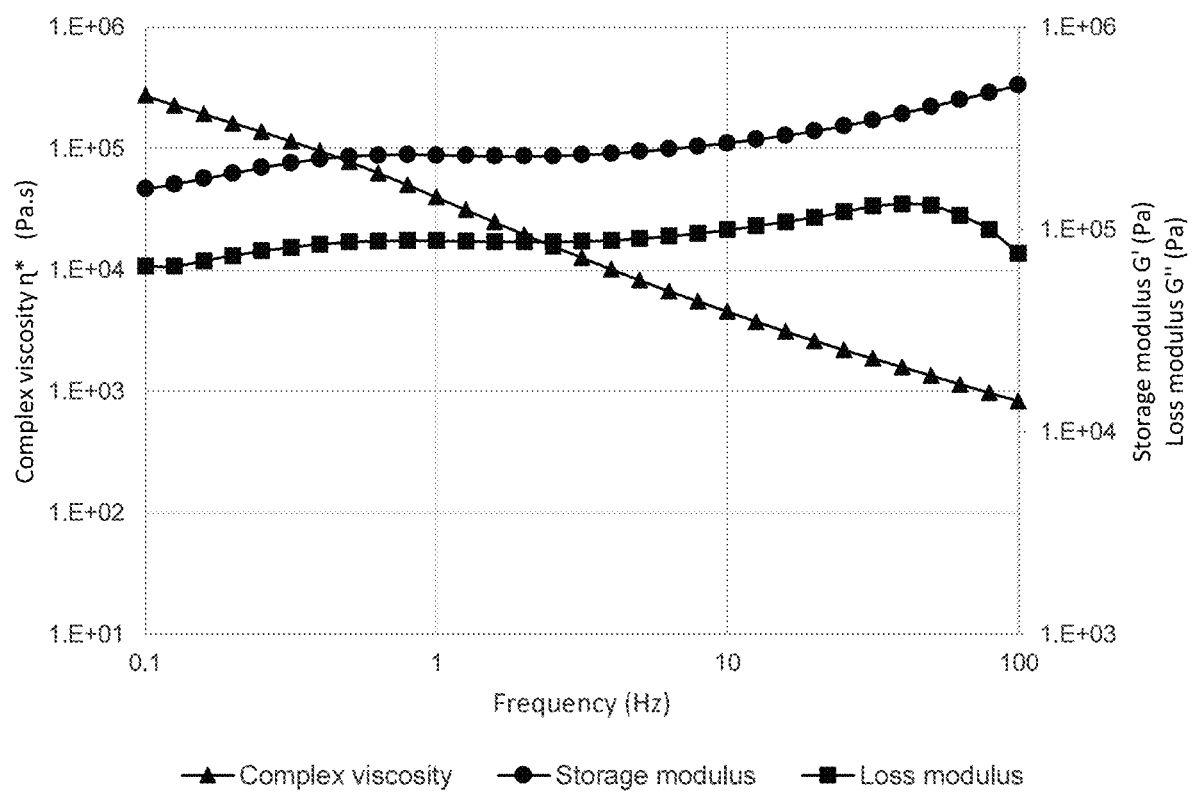
Figure 6E:
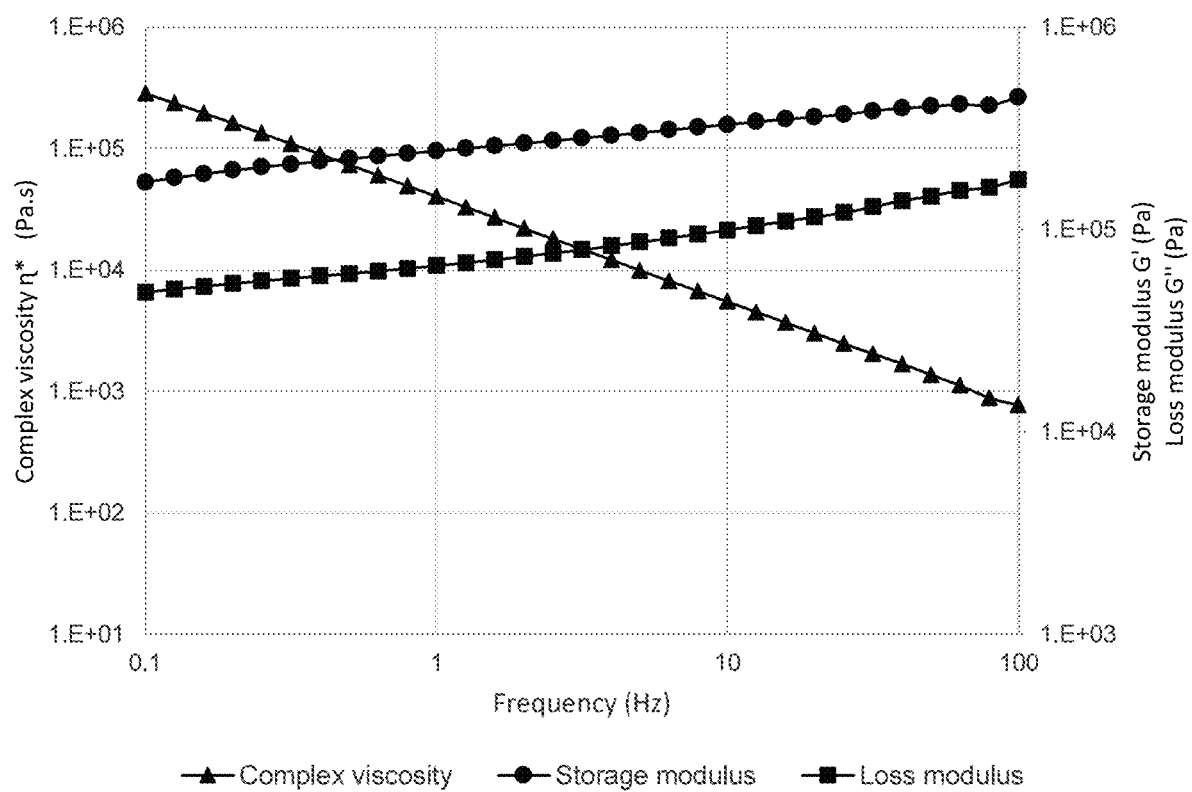

Unsorted, dried and particulated bakery residual was mixed with rheology modifiers, retrogradation preventing agents, preservatives and salt until obtaining a homogenous mixture, according to the composition shown in Table 3A. The mixture was placed in a mixing bowl in a warm water bath (~90° C.), and water was added gradually under mixing conditions for at least 10 minutes, until the temperature of the composition reached about 60° C. The playdough was then kneaded for at least 5 minutes, and then left to cool to room temperature, covered. Representative pictures of the playdough on this Example are shown in FIGS. 5A-5B. The rheological properties for Compositions 4-8 are shown in FIGS. 6A-6E, respectively, and Table 3B.

TABLE 3A

Compositions of Example 3

| | Concentration wt % | | | | |
|---|---|---|---|---|---|
| Component | Comp. 4 | Comp. 5 | Comp. 6 | Comp. 7 | Comp. 8 |
| Unsorted bakery residual | 34.1 | 34.7 | 36.0 | 34.2 | 35.4 |
| Water (total) | 38.7 | 39.5 | 40.9 | 38.9 | 40.2 |
| GMS | 4.3 | 4.4 | 4.6 | 4.4 | 4.5 |
| Gluten | 3.0 | 5.0 | — | — | — |
| Vegetable oil | 1.4 | 1.5 | 1.5 | 1.5 | 1.5 |
| Potato starch | 3.6 | 1.2 | 1.2 | 1.2 | 1.2 |
| Methylparaben | 0.2 | 0.2 | 0.2 | 0.2 | 0.2 |
| Sodium chloride | 14.7 | 14.9 | 15.5 | 14.7 | 12.0 |
| Borax | — | 0.5 | — | — | — |
| Amylopectin | — | — | — | 5.0 | 5.0 |

* Glyceryl monostearate, 40% pre-melted

TABLE 3B

Rheological test results

| Composition | Complex viscosity [log(Pa · sec)] | | |
|---|---|---|---|
| | 0.1 Hz | 1 Hz | 10 Hz |
| 4 | 5.51 | 4.68 | 3.81 |
| 5 | 5.57 | 4.7 | 3.85 |
| 6 | 5.41 | 4.63 | 3.77 |
| 7 | 5.44 | 4.6 | 3.66 |
| 8 | 5.45 | 4.6 | 3.74 |
| Reference | 4.7 | 3.85 | 3.06 |

As can be seen, while the complex viscosity of Compositions 4-8 is somewhat higher than, the compositions showed pseudoplastic behavior similar to those of the Reference commercial product, with very similar sensorial properties compared to the Reference commercial product.

Example 4

Unsorted, dried and particulated bakery residual was mixed with coconut oil, potato starch (dry), methylparaben, a mixture of salt consisting of calcium chloride and sodium chloride, amylopectin, titanium oxide and emulsifier (e.g. Tween 80) until a homogeneous mixture was obtained, according to the compositions shown in Table 4A (i.e. Compositions 9, 10 and 11). Hot or warm water was added to the homogeneous mixture under mixing conditions. The resulting composition was heated for about 20 minutes until the temperature of the suspension is about 55° C. The playdough composition was kneaded until the temperature of the composition is lowered to about 35° C. Following this, the playdough composition was left to cool down further to room temperature, covered.

TABLE 4A

Compositions of Example 4

| Component | Concentration wt % | | | Functionality |
|---|---|---|---|---|
| | Comp. 9 | Comp. 10 | Comp. 11 | |
| Recycled bread | 36.8 | 37.1 | 37.1 | Dough matrix, rheology (100 μm) |
| Water | 33 | 33.3 | 33.3 | Dough matrix, rheology |
| GMS* | 4.1 | 4.1 | 4.1 | Elasticity, retrogradation prevention |
| Coconut oil | 5.0 | 5.0 | 5.0 | Elasticity, retrogradation prevention |
| Potato starch (dry) | 1.2 | 1.3 | 1.3 | Elasticity |
| Methylparaben | 0.2 | 0.2 | 0.2 | Preservative (food grade) |
| Calcium chloride | 4.5 | 4.5 | 2.3 | Salt |
| Sodium chloride | 6.7 | 6.8 | 9.0 | Salt |
| Amylopectin | 5.2 | 5.3 | 5.3 | |
| Titanium Oxide | 1.7 | 0.9 | 0.9 | Colorant |
| Tween 80 | 1.5 | 1.6 | 1.6 | Emulsifier |

*Glyceryl monostearate, 40% pre-melted

TABLE 4B

Rheological test results

| Composition | Complex viscosity [log(Pa · sec)] | | |
|---|---|---|---|
| | 0.1 Hz | 1 Hz | 10 Hz |
| 9 | 5.37 | 4.55 | 3.74 |
| 10 | 5.4 | 4.57 | 3.74 |
| 11 | 5.4 | 4.57 | 3.73 |
| Reference | 4.7 | 3.85 | 3.06 |

Figure 7A:
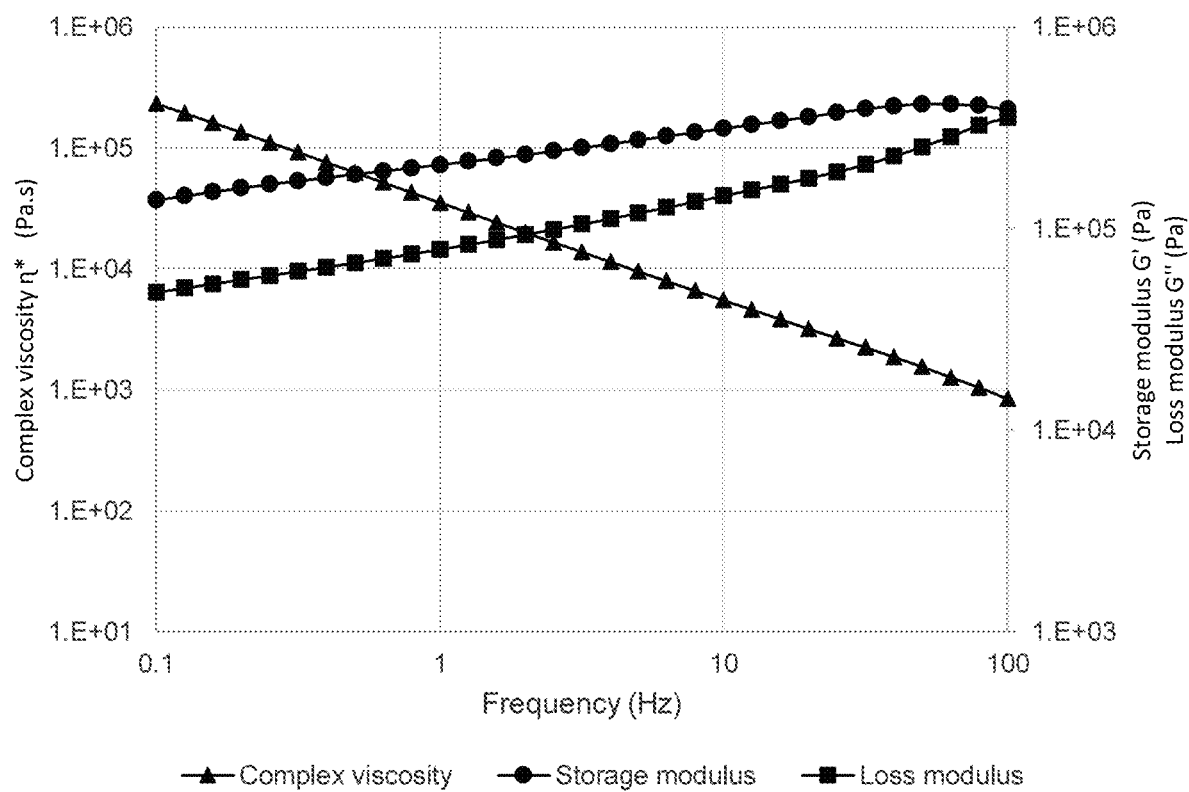
FIGS. 7A-7C show rheological properties of Compositions 9-11, respectively, according to Example 4, as measured by parallel plate rheometer, according to some embodiments of the disclosure.
Figure 7B:
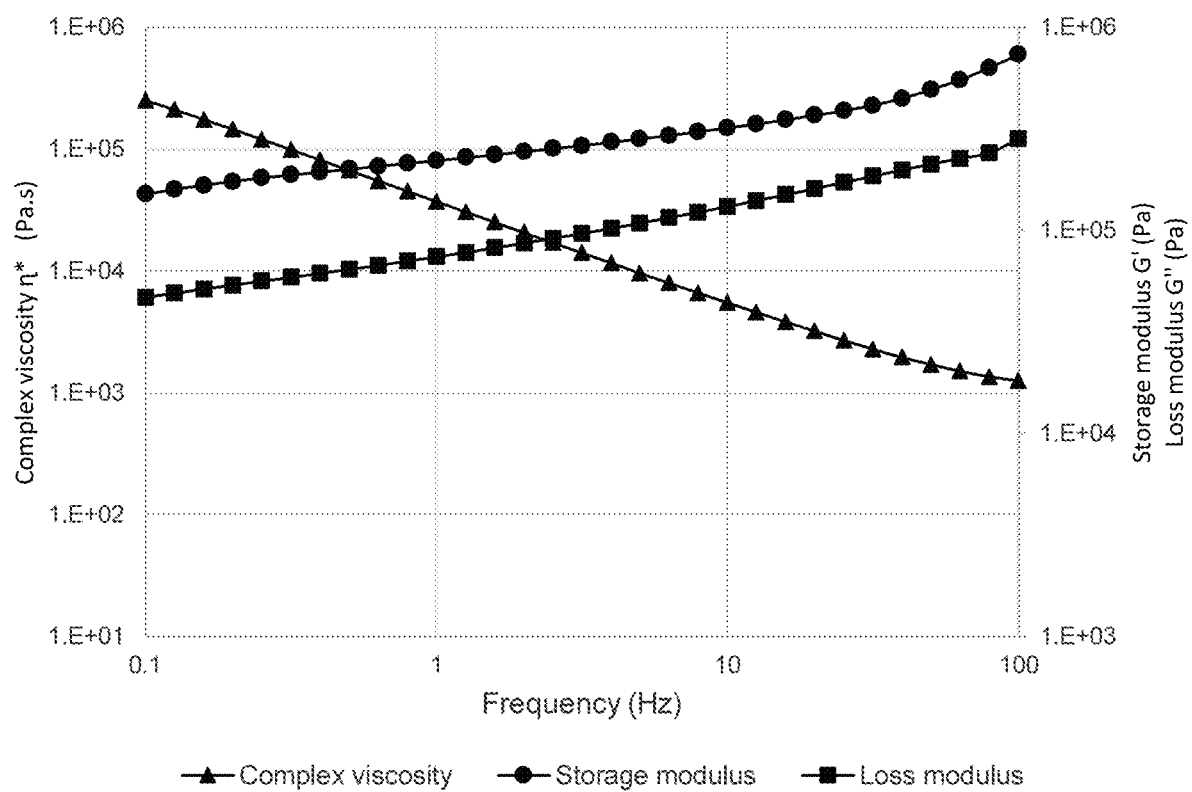
Figure 7C:
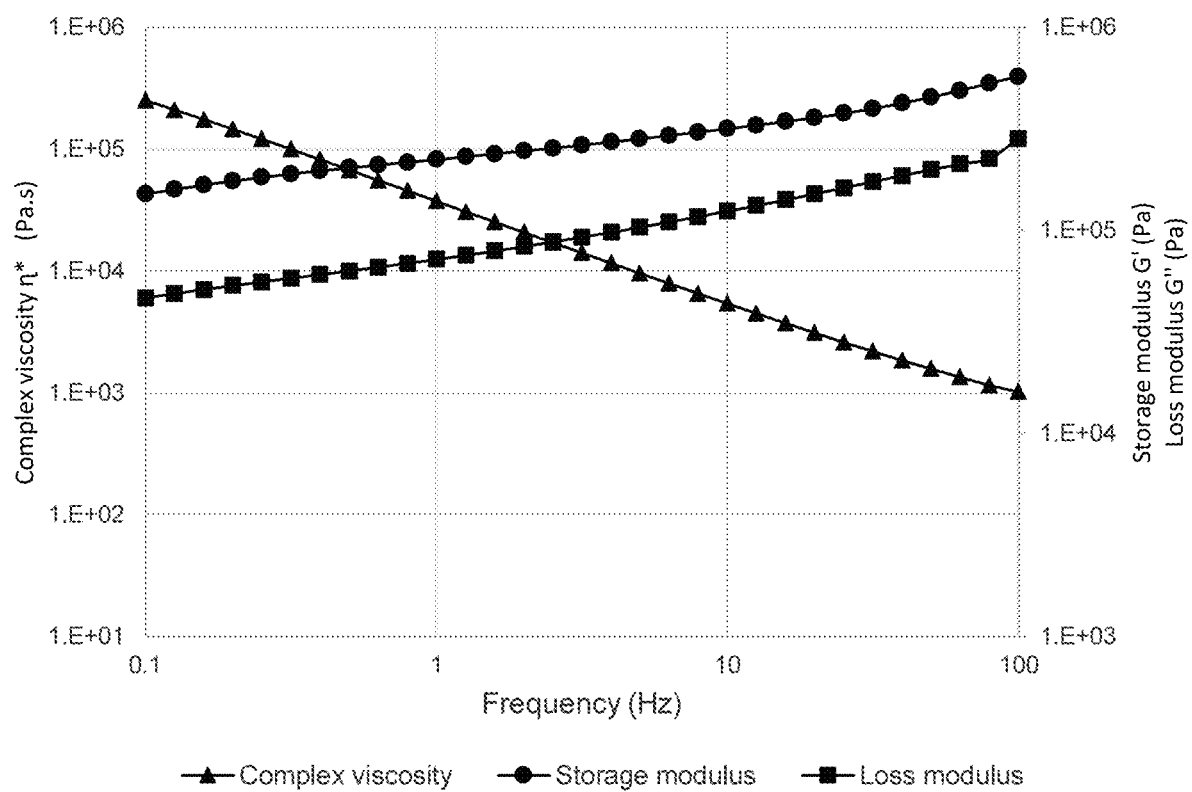

As can be seen from Table 4B, although the complex viscosity of inventive Compositions 9-11 is higher than that of the Reference commercial product, the inventive compositions showed pseudoplastic behavior similar as well as similar sensorial properties compared to the Reference commercial product. Rheological properties of Compositions 9-11 are shown in FIGS. 7A-7C.

Example 5

The compositions shown in Table 5A were prepared using the same method as the compositions prepared in Example 4, except that the coconut oil was replaced with mineral oil. There are three distinct compositions prepared in this example and they differ in the average particle size of the unsorted bakery residual used. Composition 12 was made from the unsorted bakery residual consisting of 50 wt % unsorted bakery residual having an average particle size of 100 μm and 50 wt % unsorted bakery residual having an average particle size of 200 μm. Composition 13 was made from the unsorted bakery residual having a particle size in a range of from 100 μm to 200 μm. Composition 14 was made from the unsorted bakery residual having an average particle size of 100 μm.

TABLE 5A

Compositions of Example 5

| Component | Concentration wt % | Functionality |
|---|---|---|
| Recycled bread (dry) | 36.6 | Dough matrix, rheology (Composition 12, Composition 13 and Composition 14**) |
| Water | 33.8 | Dough matrix, rheology |
| GMS* | 4.7 | Elasticity, retrogradation prevention |
| Mineral oil | 3.6 | Elasticity, retrogradation prevention |
| Potato starch (dry) | 1.2 | Elasticity |
| Methylparaben | 0.2 | Preservative (food grade) |
| Calcium chloride | 4.4 | |
| Sodium chloride | 6.7 | |
| Amylopectin | 5.2 | |
| Titanium Oxide | 2.1 | |
| Tween 80 | 1.5 | |

*Glyceryl monostearate, 40% pre-melted
**Compositions 12, 13 and 14 differ in the average particle size of the unsorted recycled bread used It is appreciated that certain features detailed in this disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment disclosed herein. Certain features described in the context of various embodiments are not to be considered essential features of those embodiments, unless the embodiment is rendered inoperative without those elements.

The invention claimed is:

1. A process of manufacturing a biodegradable playdough comprising at least 75 wt % of biodegradable components based on the total weight of the playdough, the process comprising:
    (a) particulating bread waste to an average particle size of at most 200 µm, thereby obtaining particulated bread waste;
    (b) mixing the particulated bread waste with at least one rheology modifier, at least one retrogradation prevention agent and water to obtain a mixture, wherein said mixture comprises at least 30 wt % bread waste and maintaining the mixture at a temperature of at least about 40° C. for a predefined period of time; and
    (c) cooling the mixture to a room temperature to obtain said biodegradable playdough.

2. The process of claim 1, wherein said bread waste comprises one or more types of bread.

3. The process of claim 1, wherein the particulated bread waste has an average particle size of between about 1 µm and about 100 µm.

4. The process of claim 1, wherein said particulating is carried out by grinding, milling, crushing, shredding, or any combination thereof.

5. The process of claim 1, further comprising step (a0), prior to step (a), step (a0) comprising drying the bread waste to a moisture quantity of less than about 10 wt % to obtain dried bread waste.

6. The process of claim 1, the mixture in step (b) is maintained at a temperature of between about 50° C. and about 90° C.

7. The process of claim 1, wherein, at step (b), said period of time is at least about 5 minutes.

8. The process of claim 1, further comprising a step (a1), between steps (a) and (b), step (a1) comprises adding one or more enzymes to the mixture to permit at least partial enzymatic decomposition of at least starch and/or gluten present in the bread.

9. The process of claim 1, wherein step (b) comprises:
    (b1) mixing said particulated bread waste with at least one rheology modifier, at least one retrogradation prevention agent to obtain a blend; and
    (b2) mixing said blend with said water to obtain said mixture.

10. The process of claim 1, wherein said water is heated to a temperature of between about 70° C. and about 100° C.

11. The process of claim 1, wherein step (b) further comprising adding into the mixture at least one functional additive selected from the group consisting of mycotoxin scavengers, colorants, odorants, antioxidants, odor masking agents, preservatives, and any mixture or combination thereof.

12. The process of claim 1, wherein said rheology modifiers are selected from the group consisting of gluten and gluten derivatives, amylopectin, starch and starch derivatives, vegetable oils, mineral oils, waxes, polysaccharides, and any mixture thereof.

13. The process of claim 1, wherein said rheology modifiers are added to the mixture in an amount of between about 1 and about 20 wt %.

14. The process of claim 1, further comprising a step (d), following step (c), step (d) comprises adding at least one secondary additive to the mixture.

15. The process of claim 1, wherein step (b) further comprises adding into the mixture at least one salt selected from the group consisting of sodium chloride (NaCl) and calcium chloride ($CaCl_2$), such that the biodegradable playdough comprising at least one salt in an amount of between about 10 and about 25 wt %.

16. The process of claim 1, wherein the at least one retrogradation preventing agent comprises at least one biodegradable emulsifier selected from the group consisting of one or more of mono- and di-glycerides of fatty acids, sodium stearoyl lactylate, calcium stearoyl lactylate, diacetyl tartaric acid ester of mono- and di- glycerides of fatty acids, glycerol monostearate (GMS), and mixture thereof.

17. The process of claim 16, wherein the at least one biodegradable emulsifier comprising an anionic surfactant, a cationic surfactant or a nonionic surfactant.

18. The process of claim 1, wherein step (b) further comprises adding into the mixture calcium chloride ($CaCl_2$).

19. A biodegradable playdough composition, comprising:
    i) at least about 30 wt % bread waste wherein the bread waste is in particulate form, having an average particle size of no more than about 200 µm,
    ii) at most about 50 wt % water, and
    iii) a combination of functional additive comprising at least one rheology modifier and at least one retrogradation preventing agent, the biodegradable playdough composition comprising at least about 75 wt % of biodegradable components based on the total weight of the composition, the biodegradable playdough composition having a complex viscosity of between about $1\times10^4$ and about $1\times10^6$ Pa·s (as measured by parallel plates rheometer, at 25° C., at 0.1 Hz).

20. The biodegradable playdough composition of claim 19, further comprising at least one functional additive selected from the group consisting of a mycotoxin scavenger a preservative, an antioxidant, a colorant, an odorant, and an odor masking agent.

21. The biodegradable playdough composition of claim 19, being compostable.

22. The biodegradable playdough composition of claim 19, wherein said bread waste comprises one or more types of bread.

23. The biodegradable playdough composition of claim 19, wherein said rheology modifier is selected from the group consisting of gluten and gluten derivatives, amylopectin, starch and starch derivatives, vegetable oils, mineral oils, waxes, polysaccharides, and any mixture thereof.

24. The biodegradable playdough composition of claim 19, wherein said rheology modifier is present in the playdough composition in an amount of between about 1 and about 20 wt %.

25. The biodegradable playdough composition of claim 19, further comprising at least one salt in an amount of between about 10 and about 25 wt %.

26. A kit comprising one or more portioned quantities of a playdough composition and at least one organoleptic additive, the playdough composition comprising:
    i) at least about 30 wt % bread waste wherein the bread waste is in particulate form, having an average particle size of no more than about 200 µm,
    ii) at most about 50 wt % water, and
    iii) a combination of functional additive comprising at least one rheology modifier and at least one retrogradation preventing agent, the biodegradable playdough composition comprising at least about 75 wt % of biodegradable components based on the total weight of the composition, the biodegradable playdough composition having a complex viscosity of between about $1\times10^4$ and about $1\times10^6$ Pa·s (as measured by parallel plates rheometer, at 25° C., at 0.1 Hz).

27. The biodegradable playdough composition of claim 19, wherein the at least one retrogradation preventing agent comprise at least one biodegradable emulsifier selected from the croup consisting of one or more of mono- and di-glycerides of fatty acids, sodium stearoyl lactylate, calcium stearoyl lactylate, diacetyl tartaric acid ester of mono- and di- glycerides of fatty acids, glycerol monostearate (GMS), and mixture thereof.

28. The biodegradable playdough composition of claim 19, further comprising a colorant selected from the group consisting of carotenoids, anthocyanins, betalains, chlorophyll, calcium carbonate, clay, bentonite, earth minerals, titanium dioxide and mixtures thereof.

* * * * *